United States Patent
Marathe et al.

(10) Patent No.: US 12,103,822 B2
(45) Date of Patent: Oct. 1, 2024

(54) ELEVATOR SYSTEM SAFETY BRAKE

(71) Applicant: Otis Elevator Company

(72) Inventors: Girija Marathe, Brookfield, CT (US); David R. Torlai, Torrington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/935,664

(22) Filed: Sep. 27, 2022

(65) Prior Publication Data

US 2024/0101392 A1    Mar. 28, 2024

(51) Int. Cl.
*B66B 5/22* (2006.01)
*B23K 1/00* (2006.01)
*B23K 101/34* (2006.01)
*B23K 103/00* (2006.01)

(52) U.S. Cl.
CPC .............. *B66B 5/22* (2013.01); *B23K 1/0008* (2013.01); *B23K 2101/34* (2018.08); *B23K 2103/50* (2018.08)

(58) Field of Classification Search
CPC ....................................................... B66B 5/22
See application file for complete search history.

(56) References Cited

U.S. PATENT DOCUMENTS 5,782,319 A * 7/1998 Woodruff ............... B66B 5/22
                                                  188/189
10,597,257 B2 * 3/2020 Duvall ................... B66B 7/046

FOREIGN PATENT DOCUMENTS

| CN | 1219496 A | * | 6/1999 | ............... B66B 5/22 |
|---|---|---|---|---|
| CN | 102219140 A | * | 10/2011 | |
| CN | 104891302 A | * | 9/2015 | |
| CN | 106185528 A | * | 12/2016 | |
| CN | 211733509 U | | 10/2020 | |
| CN | 113247732 A | | 8/2021 | |
| DE | 102006060775 A1 | * | 6/2008 | ............. F16D 65/18 |
| EP | 3666713 A1 | * | 6/2020 | |
| JP | H10182031 A | * | 7/1998 | |
| JP | 2015013696 A | * | 1/2015 | ............... B66B 5/22 |
| WO | WO-2015191696 A1 | * | 12/2015 | ............... B66B 5/04 |

OTHER PUBLICATIONS

Machine Translation of EP 3666713.*
European Search Report for European Application No. 22207907.1; dated Aug. 11, 2023; 34 pages.

* cited by examiner

*Primary Examiner* — Diem M Tran
(74) *Attorney, Agent, or Firm* — CANTOR COLBURN LLP

(57) ABSTRACT

A braking mechanism includes a wedge selectably engageable with a guide rail, and a frictional surface defined on the wedge configured for selective engagement with the guide rail in an overspeed condition. The frictional surface includes a friction coating of polycrystalline blocky diamond material. An elevator system includes an elevator car, a guide rail along which the elevator car travels, and a braking mechanism located at the elevator car and selectably engageable with the guide rail to slow or stop travel of the elevator car along the guide rail. The braking mechanism includes a wedge having a frictional surface configured for selective engagement with the guide rail in an overspeed condition. The frictional surface includes a friction coating of polycrystalline blocky diamond material.

17 Claims, 4 Drawing Sheets

ELEVATOR SYSTEM SAFETY BRAKE

BACKGROUND

Exemplary embodiments pertain to the art of safety brakes for, for example, elevator systems.

Many elevator systems include a hoisted elevator car, a counterweight, a tension member which connects the hoisted elevator car and the counterweight, and a sheave that contacts the tension member. During operation of such an elevator system, the sheave may be driven by a machine to move the elevator car and the counterweight through the hoistway, with their movement being guided by guide rails. Typically a governor is used to monitor the speed of the elevator car. According to standard safety regulations, such elevator systems must include an emergency braking device known as a safety brake which is capable of stopping the elevator car from moving downwards, even if the tension member breaks, by gripping a guide rail.

BRIEF DESCRIPTION

In one embodiment, a braking mechanism system includes a wedge selectably engageable with a guide rail, and a frictional surface defined on the wedge configured for selective engagement with the guide rail in an overspeed condition. The frictional surface includes a friction coating of polycrystalline blocky diamond material.

Additionally or alternatively, in this or other embodiments the wedge includes a wedge insert installed to the wedge. The friction coating is applied to the wedge insert.

Additionally or alternatively, in this or other embodiments the polycrystalline blocky diamond material has a 40/50 grit size.

Additionally or alternatively, in this or other embodiments the friction coating has a thickness of greater than 450 microns.

Additionally or alternatively, in this or other embodiments the friction coating has a diamond coverage of greater than 50% of the frictional surface.

Additionally or alternatively, in this or other embodiments the friction coating has a diamond coverage of less than or equal to 76% of the frictional surface.

Additionally or alternatively, in this or other embodiments the friction coating is applied in a pattern including one of a plurality of diamond shapes or a plurality of chevron shapes on the frictional surface.

Additionally or alternatively, in this or other embodiments the friction coating is secured to the frictional surface via vacuum brazing.

Additionally or alternatively, in this or other embodiments the vacuum brazing is performed with a nickel chromium alloy brazing paste to attach the diamond securely to the frictional surface.

Additionally or alternatively, in this or other embodiments an actuator selectably moves the frictional surface into engagement with the guide rail.

In another embodiment, an elevator system includes an elevator car, a guide rail along which the elevator car travels, and a braking mechanism located at the elevator car and selectably engageable with the guide rail to slow or stop travel of the elevator car along the guide rail. The braking mechanism includes a wedge having a frictional surface configured for selective engagement with the guide rail in an overspeed condition. The frictional surface includes a friction coating of polycrystalline blocky diamond material.

Additionally or alternatively, in this or other embodiments the wedge includes a wedge insert installed to the wedge, the friction coating applied to the wedge insert.

Additionally or alternatively, in this or other embodiments the polycrystalline blocky diamond material has a 40/50 grit size.

Additionally or alternatively, in this or other embodiments the friction coating has a thickness of greater than 450 microns.

Additionally or alternatively, in this or other embodiments the friction coating has a diamond coverage of greater than 50% of the frictional surface.

Additionally or alternatively, in this or other embodiments the friction coating has a diamond coverage of less than or equal to 76% of the frictional surface.

Additionally or alternatively, in this or other embodiments the friction coating is applied in a pattern including one of a plurality of diamond shapes or a plurality of chevron shapes on the frictional surface.

Additionally or alternatively, in this or other embodiments the friction coating is secured to the frictional surface via vacuum brazing.

Additionally or alternatively, in this or other embodiments the vacuum brazing is performed with a nickel chromium alloy brazing paste to attach the diamond securely to the frictional surface.

Additionally or alternatively, in this or other embodiments an actuator selectably moves the frictional surface into engagement with the guide rail.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
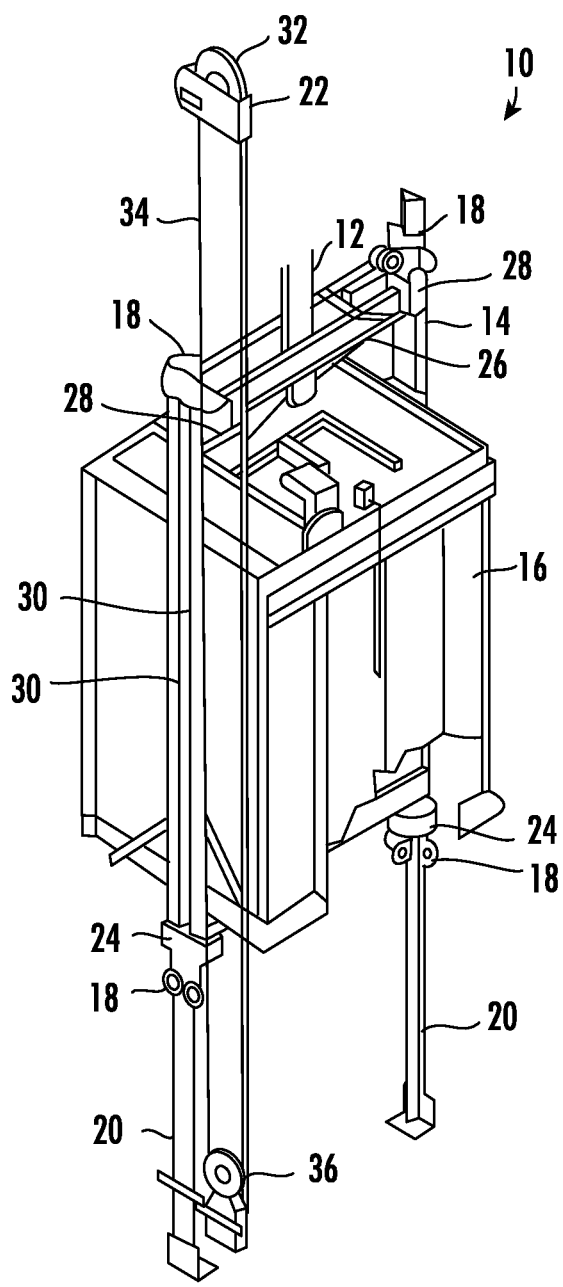
FIG. 1 is a schematic illustration of an embodiment of an elevator system.

FIG. 1 shows an elevator system, generally indicated at 10. The elevator system 10 includes cables 12, a car frame 14, an elevator car 16, roller guides 18, guide rails 20, a governor 22, safety brake 24, linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Elevator car 16, which is attached to car frame 14, moves up and down the hoistway by force transmitted through cables or belts 12 to car frame 14 by an elevator drive (not shown) commonly located in a machine room at the top of the hoistway. Roller guides 18 are attached to car frame 14 to guide the elevator car 16 up and down the hoistway along guide rail 20. Governor sheave 32 is mounted at an upper end of the hoistway. Rope loop 34 is wrapped partially around governor sheave 32 and partially around tensioning sheave 36 (located in this embodiment at a bottom end of the hoistway). Rope loop 34 is also connected to elevator car 16 at lever 28, ensuring that the angular velocity of governor sheave 32 is directly related to the speed of elevator car 16.

In the elevator system 10 shown in FIG. 1, governor 22, an electromechanical brake (not shown) located in the machine room, and the safety brake 24 act to stop elevator car 16 if it exceeds a set speed as it travels inside the hoistway. If elevator car 16 reaches an over-speed condition, governor 22 is triggered initially to engage a switch, which in turn cuts power to the elevator drive and then drops the brake to arrest movement of the drive sheave (not shown) and thereby arrest movement of elevator car 16. If, however, the elevator car 16 continues to experience an over speed condition, governor 22 may then act to trigger the safety brake 24 to arrest movement of elevator car 16. To do this, governor 22 releases a clutching device that grips the governor rope 34. The governor rope 34 is connected to the safety brake 24 through mechanical linkages 26, levers 28, and lift rods 30. As elevator car 16 continues its descent unaffected by the brake, governor rope 34, which is now prevented from moving by actuated governor 22, pulls on operating lever 28. Operating lever 28 "sets" the safety brake 24 by moving linkages 26 connected to lift rods 30, which lift rods 30 cause the safety brake 24 to engage guide rails 20 to bring elevator car 16 to a stop.

Figure 2:
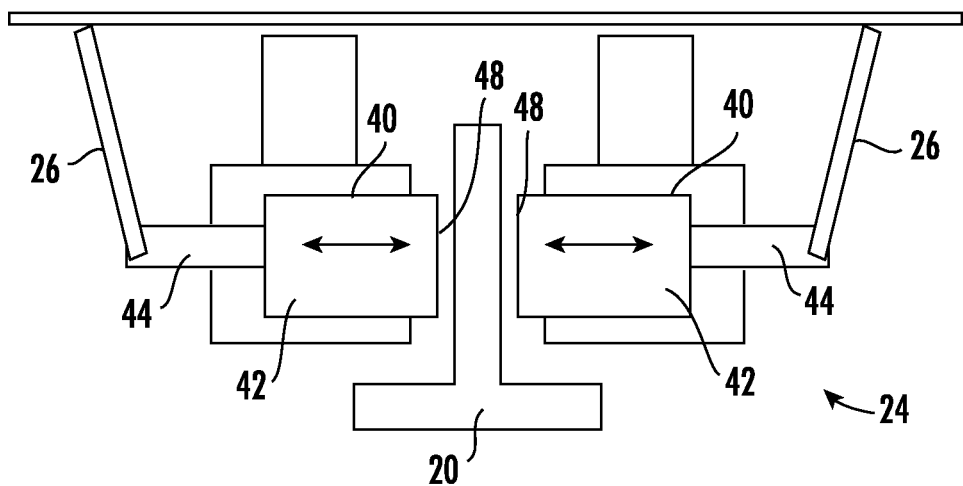
FIG. 2 is a schematic illustration of an embodiment of a safety brake and a guide rail of an elevator system.

Referring now to FIG. 2, the safety brake 24 includes one or more brake wedges 42. The wedge 42 is movable toward the guide rail 20 via an actuator 44, which in some embodiments is connected to the wedge 42 via the linkages 26. When the actuator 44 is activated, the wedge 42 is urged toward the guide rail 20 and into engagement with the guide rail 20 to slow or stop travel of the elevator car 16. The wedge 42 includes a friction surface 48 of the wedge 42 to the guide rail 20. The friction surface 48 engages with the guide rail 20 when the safety brake 24 is activated. While in the illustrated embodiment, the safety brake 24 is connected to a governor 22 via linkages 26 to activate the safety brake 24, one skilled in the art will readily appreciate that the present disclosure may be applied to other braking mechanism configurations utilized, for example, in elevator systems such as governorless systems in which an electronic safety actuator is used to activate the safety brake 24, or a ropeless or beltless elevator system that uses linear motors or pinched wheel propulsion to drive movement of the elevator car 16 along the guide rail 20.

Figure 3:
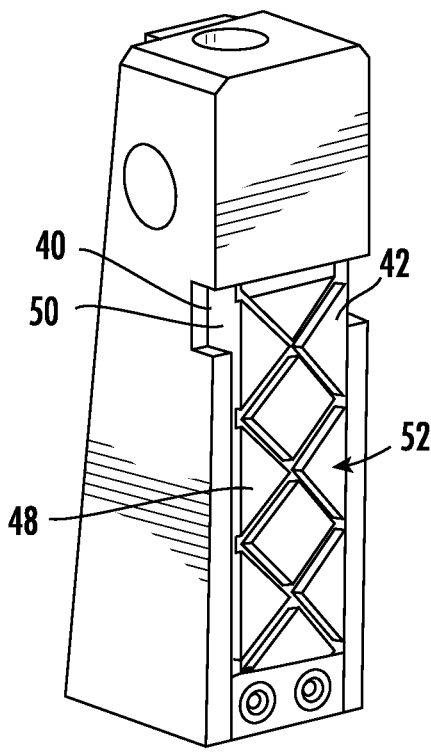
FIG. 3 is an illustration of an embodiment of a wedge of a safety brake.

Referring now to FIG. 3, the wedge 42 includes a wedge insert 50 installed into the wedge 42 and a friction coating 52, with the friction coating 52 defining the friction surface 48. In some embodiments the wedge insert 50 is formed from steel, and installed into a wedge recess 40 in the wedge 42. Further, the friction coating 52 is formed from polycrystalline blocky diamond material secured to the wedge insert 50 by, for example, a vacuum brazing process. In one embodiment the diamond material has a 40/50 grit. The friction coating 52 has a thickness on the wedge insert 50 in the range of 400 to 500 microns, and in some embodiments is greater than 450 microns. While in the illustrated embodiments the friction coating 52 is applied to the wedge insert 50, in other embodiments the wedge insert 50 is omitted and the friction coating 52 is applied to the wedge 42 to define the friction surface 48.

Figure 4:
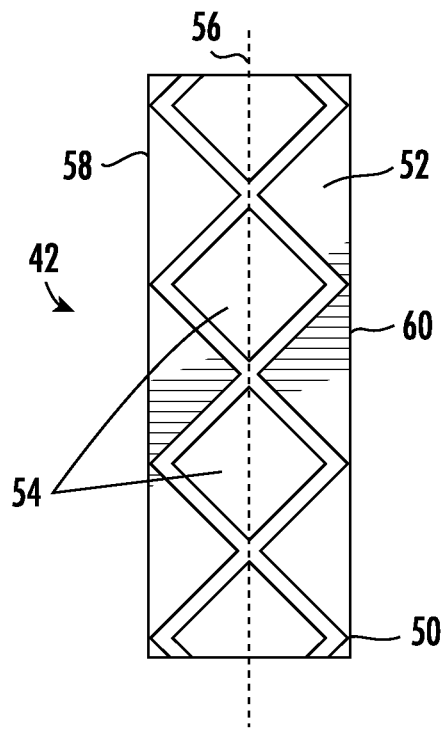
FIG. 4 is an embodiment of a wedge coating of a safety brake wedge.
Figure 5:
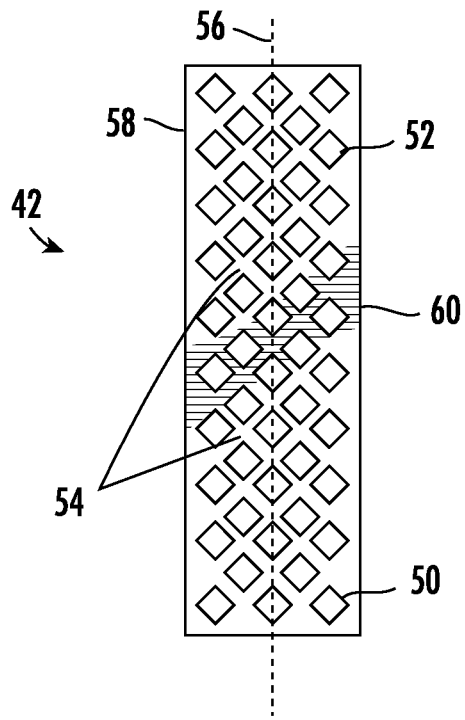
FIG. 5 is another embodiment of a wedge coating of a safety brake wedge.
Figure 6:
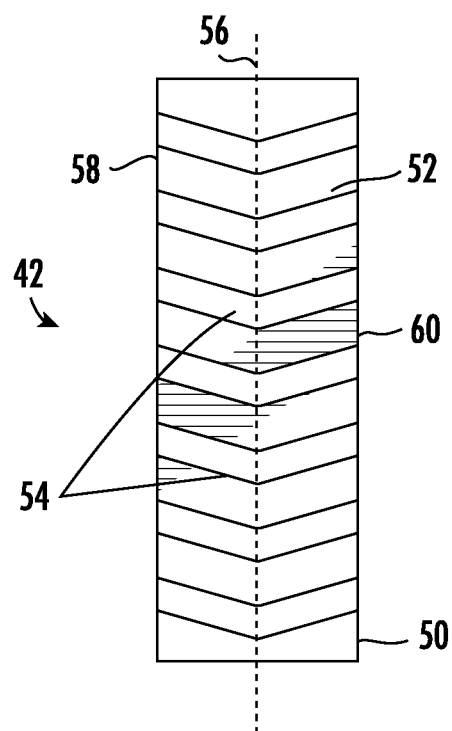
FIG. 6 is yet another embodiment of a wedge coating of a safety brake wedge.

As illustrated in FIGS. 4-6, the friction coating 52 is applied to the wedge insert 50 in a variety of coverage patterns, which in some embodiments provide coverage of the friction coating 52 on the wedge insert 50 in the range of 45% to 76%. In one embodiment illustrated in FIG. 4, the friction coating 52 is applied in a diamond pattern, with a center of each diamond shape 54 located at a lateral centerline 56 of the wedge insert 50. The diamond shapes 54 are spaced apart such that a region of uncoated wedge insert 50 is between adjacent diamond shapes 54. In the embodiment of FIG. 4, the diamond shapes 54 each extend from a first lateral side 58 of the wedge insert 50 to a second lateral side 60 of the wedge insert 50, opposite the first lateral side 58. In another embodiment, illustrated in FIG. 5, the diamond shapes 54 are smaller in size and extend only partially across the wedge insert 50. In this embodiment, a plurality of full diamond shapes 54 are arrayed laterally across the wedge insert 50. In some embodiments, the number of full diamond shapes 54 arrayed across the lateral width is three or more. In yet another embodiment, illustrated in FIG. 6, the friction coating 52 is applied in a plurality of chevron shapes 62. The chevron shapes 62 are laterally centered on the lateral centerline 56 of the wedge insert 50, and extend fully from the first lateral side 58 to the second lateral side 60. The chevron shapes 62 are sized and spaced to provide a selected percentage of coverage of the wedge insert 50 with the friction coating 52. It is to be appreciated, however, that these configurations are merely exemplary and one skilled in the art will readily appreciate that other friction coating 52 patterns may be utilized to provide the desired coverage of the friction surface 48 and the desired performance.

Exceptional performance in terms of high friction, apparent coefficient of friction (ACOF) and minimal wear was observed for patterns containing coating coverage above 50%. In some embodiments, the coating coverage is in the range of 45% to 76%. The apparent coefficient of friction was higher than an ACOF obtained on current friction plate at high speed. In some embodiments, the diamond coated friction surface 48 uses a nickel-chromium alloy as a brazing paste which allows the friction surface 48 to be insensitive to corrosion. The wedge insert 50 can be made of any corrosion resistant steel in order to further protect the entire surface. For durability/robustness, due to the use of very high brazing temperature, the nickel chromium brazing alloy & diamond form a strong metallurgical bond with the base alloy of the wedge insert 50 giving the required strength to sustain impact.

The configurations disclosed herein with vacuum brazing the wedge insert 50 with diamond has benefits in terms of reduced cost, improved performance and insensitive to rail condition. The disclosed configuration provide a cost-effective alternative with ease of batch manufacturing in comparison to the current friction insert. The present disclosure utilizes 40/50 grit consisting of diamond size range which allows consistent 100% contact with the guide rail surface unlike friction plate with flatness issues. While 40/50 grit is utilized in the illustrated embodiments, in other embodiments higher or lower grit may be utilized. The mechanical properties of high stiffness, insensitivity of the current friction plate to thermal cycling are achieved in proposed design of vacuum brazing hard diamond particles on steel substrate.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A braking mechanism, comprising:
   a wedge selectably engageable with a guide rail; and:
   a frictional surface defined on the wedge configured for selective engagement with the guide rail in an overspeed condition;
   wherein the frictional surface comprises a friction coating of polycrystalline blocky diamond material;
   wherein the friction coating covers the friction surface with a pre-defined coverage pattern, the predefined coverage pattern including a plurality of predetermined shapes covered by the friction coating, adjacent predetermined shapes of the plurality of predetermined shapes spaced apart by areas uncoated by the friction coating;
   wherein the wedge includes a wedge insert installed into a wedge recess in the wedge, the friction coating applied to the wedge insert;
   wherein the friction coating is applied in a pattern comprising a plurality of chevron shapes spaced apart on the frictional surface.

2. The braking mechanism of claim 1, wherein the polycrystalline blocky diamond material has a 40/50 grit size.

3. The braking mechanism of claim 1, wherein the friction coating has a thickness of greater than 450 microns.

4. The braking mechanism of claim 1, wherein the friction coating has a diamond coverage of greater than 50% on the frictional surface.

5. The braking mechanism of claim 1, wherein the friction coating has a diamond coverage of less than or equal to 76% of the frictional surface.

6. The braking mechanism of claim 1, wherein the friction coating is secured to the frictional surface via vacuum brazing.

7. The braking mechanism of claim 6, wherein the vacuum brazing is performed with a nickel chromium alloy brazing paste to attach the diamond securely to the frictional surface.

8. The braking mechanism of claim 1, further comprising an actuator to selectably move the frictional surface into engagement with the guide rail.

9. An elevator system, comprising:
   an elevator car;
   a guide rail along which the elevator car travels; and
   a braking mechanism disposed at the elevator car and selectably engageable with the guide rail to slow or stop travel of the elevator car along the guide rail, the braking mechanism including:
   a wedge having a frictional surface configured for selective engagement with the guide rail in an overspeed condition;
   wherein the frictional surface comprises a friction coating of polycrystalline blocky diamond material;
   wherein the friction coating covers the friction surface with a pre-defined coverage pattern, the predefined coverage pattern including a plurality of predetermined shapes covered by the friction coating, adjacent predetermined shapes of the plurality of predetermined shapes paced apart by areas uncoated by the friction coating;
   wherein the wedge includes a wedge insert installed into a wedge recess in the wedge, the friction coating applied to the wedge insert;
   wherein the friction coating is applied in a pattern comprising a plurality of chevron shapes spaced apart on the frictional surface.

10. The elevator system of claim 9, wherein the polycrystalline blocky diamond material has a 40/50 grit size.

11. The elevator system of claim 9, wherein the friction coating has a thickness of greater than 450 microns.

12. The elevator system of claim 9, wherein the friction coating has a diamond coverage of greater than 50% on the frictional surface.

13. The elevator system of claim 9, wherein the friction coating has a diamond coverage of less than or equal to 76% of the frictional surface.

14. The elevator system of claim 9, wherein the friction coating is secured to the frictional surface via vacuum brazing.

15. The elevator system of claim 14, wherein the vacuum brazing is performed with a nickel chromium alloy brazing paste to attach the diamond securely to the frictional surface.

16. The elevator system of claim 9, further comprising an actuator to selectably move the frictional surface into engagement with the guide rail.

17. An elevator system, comprising:
    an elevator car;
    a guide rail along which the elevator car travels;
    a governor rope operably connected to the elevator car and configured to control a speed of movement of the elevator care along the hoistway; and
    a braking mechanism disposed at the elevator car and selectably engageable with the guide rail to slow or stop travel of the elevator car along the guide rail, the braking mechanism including:
    a wedge having a frictional surface configured for selective engagement with the guide rail in an overspeed condition;
    wherein the frictional surface comprises a friction coating of polycrystalline blocky diamond material;
    wherein the friction coating covers the friction surface with a pre-defined coverage pattern, the predefined coverage pattern including a plurality of predetermined shapes covered by the friction coating, adjacent predetermined shapes of the plurality of predetermined shapes paced apart by areas uncoated by the friction coating;

wherein the wedge includes a wedge insert installed into a wedge recess in the wedge, the friction coating applied to the wedge insert;

wherein the wedge is operably connected to the governor rope via a linkage arrangement;

wherein the friction coating is applied in a pattern comprising a plurality of chevron shapes spaced apart on the frictional surface.

\* \* \* \* \*